March 2, 1926. Re. 16,279
R. ELLIS
SEPARATING PROCESS
Original Filed April 15 1918
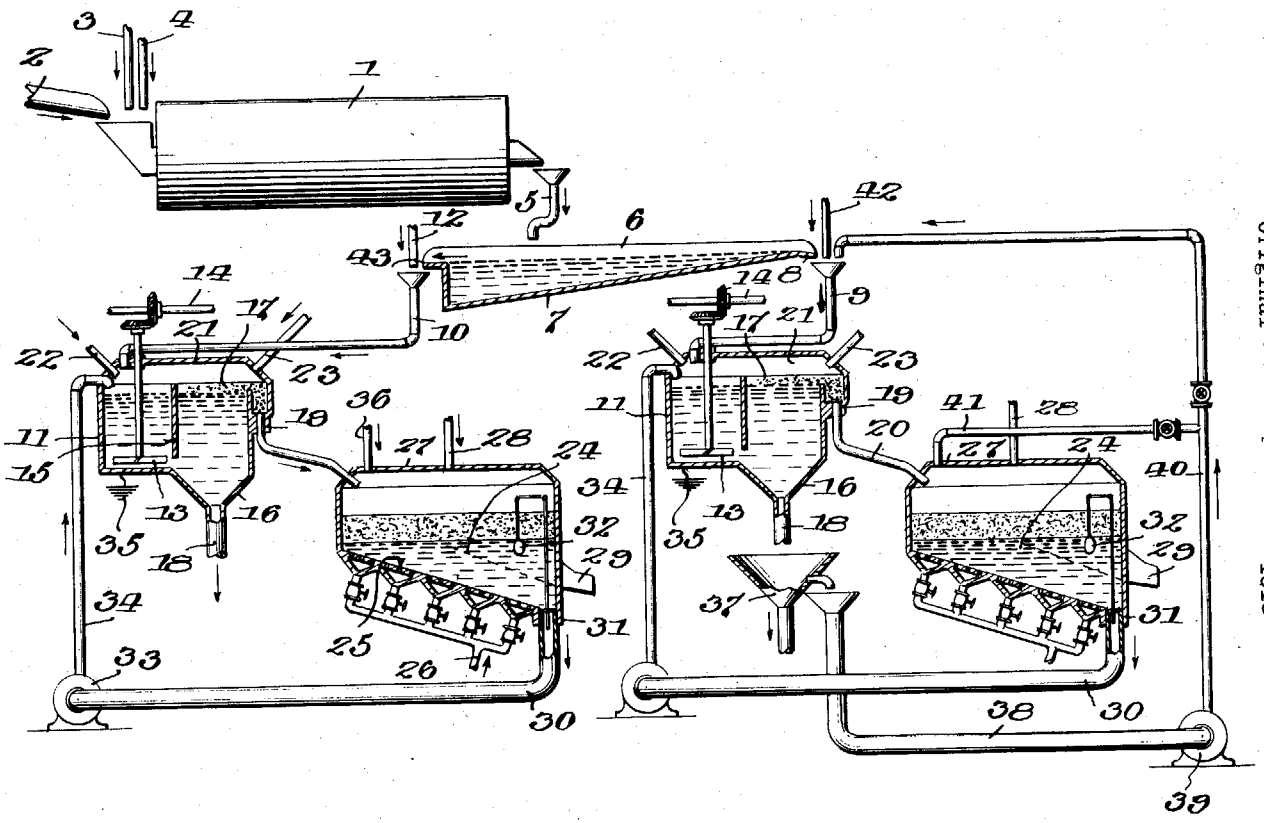
Inventor
Ridsdale Ellis,
By Stewart & McKay
his Attorneys.

Reissued Mar. 2, 1926. Re. 16,279

UNITED STATES PATENT OFFICE.

RIDSDALE ELLIS, OF OAK PARK, ILLINOIS, ASSIGNOR TO ELLIS FLOTATION COMPANY, INC., OF NEW YORK, N. Y., A CORPORATION OF NEW YORK.

SEPARATING PROCESS.

Original application filed April 15, 1918, Serial No. 228,623. Divided and application filed April 2, 1919, Serial No. 287,030. Original No. 1,425,186, dated August 8, 1922. Application for reissue filed August 1, 1924. Serial No. 729,623.

*To all whom it may concern:*

Be it known that I, RIDSDALE ELLIS, a citizen of the United States, and a resident of Oak Park, in the county of Cook and State of Illinois, have invented certain new and useful Improvements in Separating Processes, of which the following is a specification.

My invention relates to processes for concentrating parts of masses of composite character, such as metalliferous ore, by treating the comminuted mass with a fluid adapted to aid in the separation of certain of the comminuted particles from others having different qualities.

This application is a division of my copending application Serial No. 228,623, filed April 15, 1918, and a continuation in part of my co-pending application Serial No. 75,430 filed January 31, 1916.

Broadly my invention includes the use of means for producing certain changes in the fluid and the particles of the mass whereby the separation of certain of the comminuted particles from others having different qualities is aided. Preferably such means include the use of substances adapted when dissolved in fluid, preferably an ionizing fluid, to bring about certain electrical changes, and to this end to give polyvalent ions for aiding in the separation of certain of the particles from others by means of a fluid having a preferential affinity for certain of the particles.

More particularly, in its preferred form, my invention relates to processes for concentrating metalliferous ores by means of the combined action of gaseous bubbles and oil, or other substances soluble or insoluble, adapted to aid in the formation of a froth containing the metalliferous constituents of the ore.

My invention is particularly adapted for the concentration of sulphide ores, but is also applicable to the concentration of other ores, such as oxides, carbonates or hydroxides, either unchanged or after a sulphiding or other treatment, native or precipitated copper, gold, and for the concentration of graphite and other similar materials.

The principal objects of my invention are in general to enhance the efficiency of concentrating processes as hitherto carried out; to increase the percentage extraction and rate of separation of the metalliferous constituents; to improve the grade of concentrate; and in particular to improve froth flotation processes for the concentration of ores and similar comminuted materials of diverse character.

To this end my invention contemplates the use of electrolytes of various types and the modification of the flotation processes as commonly carried out to enable the beneficial action of such electrolytes to be more fully obtained The effect produced by electrolytes may be conveniently classified according as they are due to purely physical phenomenon or to chemical reactions in which the electrolytes added react chemically or electrochemically with the constituents of the ore.

The physical action of electrolytes, more particularly inorganic electrolytes, appears to be dependent upon the valence (and to a lesser extent on the mobility) of the ions produced by the solution of the electrolytes in an ionizing fluid and is consequently electrical in its nature.

I have found that the results of such physical action may be modified by changing the time of addition of the electrolytes. Thus certain types of electrolytes give improved results when added prior to "oiling" and other types better results when added after "oiling."

There is also a very important relation between the physical action of such electrolytes and the size of the particles.

While the effects produced by electrolytes of various types are readily demonstrable the cause of these effects is far more complex.

In order, however, that the invention may be more fully understood I give a statement of the general principles underlying the formation of a froth and the action of electrolytes in aiding or hindering the separation of metalliferous matter by froth flotation processes.

Practice carried out by me has shown that results obtained by the use of electrolytes vary considerably according to the way in which the gaseous bubbles are introduced to form a froth. Bubbles may be introduced in two general ways: In the first place, the bubbles may be forced in from without, and secondly, the bubbles of gas may be generated, or otherwise produced in the liquid itself. As examples of methods of introducing gas mechanically from the outside, the mechanical agitation and pneumatic agitation may be referred to. As examples of the method of introducing gas by generating bubbles of gas in the liquid itself, the sulphuric acid plus carbonate, and the vacuum processes may be referred to.

The mechanical agitation process appears to involve both methods of introduction in varying degrees. The vortex of water produced by the rapidly rotating propellers draws into the ore pulp infinitesimally thin films of air which break up into minute air bubbles. As these minute air bubbles have a much higher solution tension than larger air bubbles, the water becomes supersaturated so far as bubble formation on a sulphide or oil surface is concerned and as a result air comes out of solution on the surface of the oiled sulphide particles. The result of the violent mechanical agitation is therefore two-fold, first, the introduction of air bubbles bodily from the external air and second, the generation of air bubbles ab initio on the surface of the oiled particles of sulphide.

In the pneumatic agitation process the generation of bubbles in the pulp does not appear to take place to any great extent.

In the formation of a froth where liquid oil is used, there appear to be two important operations, first the coating of the metalliferous particles with oil and second, the formation of a viscous bond between such oiled particles and the gaseous bubbles.

In these operations electrolytes may act in four amongst other ways:—

First in determining the readiness with which the oil can come into physical contact with the particles of sulphide.

Second in changing the readiness with which the oil after contact with the particles of sulphide will spread over the surface of the latter and the tenacity with which the oil adheres to the sulphide surfaces.

Third in determining the readiness with which the gaseous bubbles can come into physical contact with the oiled particles of sulphide.

Fourth in changing the readiness with which the oil after contact with the gaseous bubbles will spread over the surface of the latter.

The changes produced by electrolytes in any one or more of the above ways may be the result of either:—

(*a*) Changes in the electrical conditions;

(*b*) Chemical changes at the surface of the particles to be floated;

(*c*) Changes in surface tension due to absorption of the electrolyte at the oil-water, particle-water or air-water interfaces.

In the case of inorganic salts surface tension measurements indicated that (*c*) is negligible and this is confirmed by the fact that where the action of electrolytes does not follow certain laws based on the valency or number of electrical charges carried by the ions formed by the solution of the electrolytes the deviation from these laws may be attributed in most, if not all, instances, to chemical action between the electrolyte and the constituents of the ore.

With the majority of ores the most important function of electrolytes in aiding flotation appears to be the production of favorable electrical conditions.

In this respect it is not the molecules of the electrolyte which are active but the ions produced by the dissociation of the electrolyte when dissolved in an ionizing fluid such as water.

All electrolytes, whether salts, acids or alkalies, when dissolved in an ionizing fluid produce ions to an extent depending upon the degree of dissociation of the electrolyte. The valence of these ions may range from one to six and possibly, though not probably, even seven or more.

The simplest combination of ions is $M^+ R^-$ where M represents the cation or positive ion and R represents the anion or negative acid radicle ion. Now the valence of the cation or anion may each be increased separately or the valence of both may be increased simultaneously. These three changes may be represented graphically as follows:

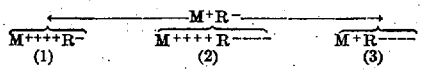

*Examples.*

| Titanium chloride. | Titanium pyrophosphate. | Sodium pyrophosphate. |
|---|---|---|
| $TiCl_4$ | $TiP_2O_7$ | $Na_4P_2O_7$ |

As the valence of the ions increases their effect on the contact and frictional electrification of the oil, sulphide and gangue particles and gaseous bubbles also increases, whether the ions are positive or negative, and these changes in the sign and magnitude of the electrification of the constituents of the ore pulp produce very marked results in the formation of a froth and the separation of the metalliferous matter by such means.

Solid or liquid particles of all kinds acquire a contact potential when suspended in pure water of from 0.03 to 0.06 volts, the particles being almost invariably (with the exception of oxides, hydroxides and some carbonates) negative with respect to the water. Gases, on the other hand, may be electrified in at least two different ways which are essentially distinct:—first, frictional electrification, and second, contact electrification. If air is blown through water it becomes electrically charged by friction with the water, and electricity may be collected from the air and also from the water. The potential of the water may reach several volts. If a bubble of air is in stationary contact with water, it acquires a contact potential of the same magnitude as that acquired by solid or liquid drops suspended in water, namely, 0.03 to 0.06 volts.

In contact electrification the conversion of the original negative charge on a particle suspended in water (whether solid, liquid or gaseous) into a positive charge is brought about by means of polyvalent cations; the higher the valence of the cations, the smaller the concentration of the electrolyte required to bring about the reversal, and the greater the positive charge which can be produced thereby. If a polyvalent anion is present, the concentration required to produce reversal is increased, and also the maximum positive charge which can be obtained is reduced. This inhibiting action of the anion increases as the valence increases. On the other hand, the original negative charge may be increased by polyvalent anions; the higher the valence of the anion the greater the increase in the negative charge which can be produced. Cations inhibit this increase in negative charge in proportion to their valence.

In frictional electrification the valence of the ions appears to have exactly the reverse effect to what they have in contact electrification. In order to produce a strong positive charge polyvalent anions must be used. The greater the valence of the anion, the smaller the concentration required to produce reversal, and the greater the positive charged which is produced. Polyvalent cations have an exactly analogous effect to polyvalent anions in the case of contact electrification as they increase the concentration of polyvalent anions required to bring about the reversal, and the effect of cations in this respect increases as the valence increases.

While the spreading of a drop of oil over a sulphide or similar surface is no doubt due to differences in surface tension at the oil-water, oil-particle, and water-particle the oil must first be brought into actual physical contact with the sulphide particle before it can spread. Now it is the electrical factors which largely determine whether or not such physical contact takes place readily or difficultly.

In pure water an oil globule is strongly charged negatively, a sulphide particle very weakly negatively. Under these conditions there is a slight electrical repulsion; add a salt of the type of sodium pyrophosphate and the negative charge on both oil globule and sulphide particle will be increased so that the electrical repulsion is also increased. On the other hand if a small amount of acid is added the potential of the sulphide becomes positive while reducing but not reversing the negative potential on the oil, under these circumstances electrical attraction occurs.

In both cases if the oil globules once comes in contact with the sulphide particle it will probably spread substantially independently of the sign and magnitude of the electrical charges on the two materials, but in the first case it is relatively difficult to get the initial contact of the oil and sulphide and so allow the surface tension forces to come into play while in the second case it is relatively easy.

Consequently as sodium pyrophosphate tends to increase the negative charge of both oil and sulphide it will inhibit "oiling", just as acid aids "oiling" by reversing the sign of the charge on the sulphide.

Although any anion, particularly a high valent ion, tends to change the contact potential of any solid or liquid particles suspended in an ionizing fluid in the same direction there is a great difference in the natural tendency of various substances to acquire and retain a negative or positive charge. Thus oil is normally strongly negatively charged and a much higher concentration of acid is required to neutralize and reverse this charge than in the case of the much more weakly negatively charged sulphide particles.

Further with salts of the type of sodium pyrophosphate the negative contact potential of oil, sulphide and other substances increases to a maximum and then decreases and the position of this maximum point depends on the chemical nature of the substance. With oil this point is reached with a higher concentration of salt than with either sulphides or silica or silicates.

If a salt is used which is adapted to give anions and cations both having a relatively high valence, such as aluminum pyrophosphate it is possible to give the sulphides a positive charge without reducing the negative potential of the oil to the same extent as when acid only is used to give the sulphides a positive charge. As oil acquires and retains a negative charge much more readily than do sulphides, a trivalent cation like aluminum has a much greater effect on the sulphides than on the oil, while at the same time the quadrivalent pyrophosphate ion has a much greater effect on the oil than on the sulphides.

In general, the higher the valence of the ions, the greater the electrical changes which can be produced and the greater the differences which can be made between the electrical potentials of two substances in contact with the same solution.

As will appear later the type of salt, which will give the oil a maximum negative potential is in general the most efficient in aiding the adhesion of the bubbles of air to the metalliferous particles, on the other hand it is not the most efficient type for oiling. Such a salt may, however, be used in relatively high concentrations to take advantage of the difference in the maximum potential points of oil and sulphide respectively. Further, a salt adapted to give both high valent cations and anions may be used to reverse the sign of the potential on the sulphides without lowering the negative potential on the oil to the same extent as the acid alone. Again, "oiling" may be caused to take place in plain water or acidified water and the sodium pyrophosphate or similar salt added after oiling and immediately prior to flotation.

Delaying the time of addition of the sodium pyrophosphate does not entirely eliminate its inhibiting effect on the oiling for the reason that in the mechanical agitation process, and to a much smaller extent in the pneumatic agitation process, the oiling, is in part at least, a reversible operation, possessing therefore a position of equilibrium. With mechanical agitation, therefore, the fact that the oil originally adhered to the sulphides is not sufficient and it is desirable, if possible, that conditions during flotation should be as favorable as possible for reoiling.

The greater the affinity of oil for the metalliferous particles the more tenaciously will the oil adhere once it has been brought into contact with the particles and the more irreversible will the operation become.

The affinity of oil for sulphide particles may be changed by salts, usually to reduce the adhesions (employed in preferential flotation), but in some cases to increase it. Such changes appear to be due to chemical rather than electrical causes.

The difference betwen the chemical and the electrical action of salts is well illustrated by the action of potassium ferrocyanide on the flotation of copper ores. In neutral solutions this salt acts as a powerful poison owing to the formation of insoluble copper ferrocyanide on the surfaces of the sulphide particles. On the other hand with an alkaline solution of the same salt very beneficial results are obtained since in the presence of alkali insoluble copper ferrocyanide is not produced so that the beneficial action of the quadrivalent anion is obtained.

Copper sulphate has a very marked chemical action. With zinc ores its use is very beneficial, with pyrite ores it is deleterious. With zinc ores it is more beneficial than the valency of the ions it forms would warrant and while copper sulphate and acid under certain circumstances appear to be more efficient than either aluminum or sodium pyrophosphate and acid, a combination of the latter salts with acid and copper sulphate gives better results than copper sulphate and acid alone.

The next factor to be considered is the air-sulphide adhesion. At the first moment of adhesion between the oiled sulphide particle and an air bubble there must be actual physical contact irrespective of the conditions which occur afterwards.

For efficient flotation both air-bubble and particle must be oiled. This may be done in one of three ways.

(1) Sulphides are oiled and air bubbles get their film of oil from the sulphides.

(2) Air bubbles are oiled (as in the case of oil vapor process) and the sulphides receive their oil from the air bubbles.

(3) Both sulphides and air bubbles are oiled independently. The first of these is the method used in circulating mechanical agitation apparatus in which oil is added in liquid form.

As already indicated, a salt of the type of sodium pyrophosphate gives the oil an increased negative charge and the air a strong frictional positive charge (dependent upon the rate of movement of the air relatively to the water) thereby producing an attraction between the oiled sulphide particles and the bubbles of air.

The effect is to bring the air and oiled sulphide particles into contact more rapidly and certainly, and thereby increase not only the extraction but also the rate of separation, as is shown by actual practice to be the case.

As the negative potential of silica and silicates is also increased by a salt of the type of sodium pyrophosphate, an increase in the amount of gangue floated would also be expected. Practice shows this to be the case.

If frictional electrification is an important feature then sodium pyrophosphate will give higher extractions with the mechanical than with the pneumatic agitation process, owing to the much more violent agitation in the former than in the latter case. This is also confirmed by practice.

The relative movement of the bubbles of gas and water produces a positive or negative charge on the gas according to the ions present in solution, and at the same time gives the water a charge of opposite sign. Now when polyvalent anions are present, the charge so produced on the water is of the same sign as that on the metalliferous particles which it is desired to unite to the bubbles of gas and consequently it is desirable to get rid of the charge on the water as it appears to have a repellant action on the similarly charged metalliferous particles which prevents the union of these particles with bubbles of gas. I have found that the charge may be advantageously eliminated, preferably by grounding the flotation apparatus so as to connect the water electrically with the earth.

I have also found that the action of electrolytes is greatly modified by the size of the particles in the ore pulp. With relatively coarse feed—say 80 to 100 mesh—the addition of sodium pyrophosphate even before oiling greatly increases the extraction whereas with slimes the addition of this salt before oiling may even decrease the extraction.

This is due to the fact that the smaller the particles the more important become the electrical factors in oiling.

In the pneumatic agitation process, unlike the mechanical agitation process, I have found that salts of the types of thorium chloride or aluminum pyrophosphate are, under some conditions, distinctly deleterious, whereas a salt of the type of sodium pyrophosphate is very useful though not producing as advantageous results as in the mechanical agitation process. Further, while acid aids the action of salts in mechanical agitation alkali is preferably used in the pneumatic agitation process.

There appear to be various reasons for this difference between the mechanical and pneumatic agitation processes.

Thus a reduction of the negative potential of the oiled sulphides is particularly deleterious in the pneumatic agitation process as much less frictional electricity is generated on the air than in the mechanical agitation process, owing to the less violent agitation. This is due to the fact that while the sign of the charge on the air depends upon the ions present in solution, its magnitude is largely dependent upon the speed at which the air bubbles are moved through the solution.

Then the production of conditions advantageous to oiling are more important in the mechanical than in the pneumatic agitation process and such conditions are aided by acid or polyvalent cations.

Further in the mechanical agitation process some generation of gas bubbles ab initio on the surface of the oiled sulphides occurs. The acquisition of a positive charge appears to favor the formation of a bubble ab initio in water since it has been shown that bubbles of gas are often, if not usually, positively charged when they have been generated from a solution which would not give a positive charge to a bubble of gas introduced bodily from an external source.

Apparently, therefore, hydrogen or high valent cations are useful as either directly or indirectly providing positive nuclei for bubble formation.

For carrying out my invention apparatus of well known types, may be employed with such modifications in construction and arrangements as may be needed to enable my improvements to be employed to best advantage. As flotation apparatus of the type proposed for use with my salts and other improvements are so well known to those skilled in the art detailed description will be unnecessary. Consequently in the accompanying drawing I have given only a diagrammatic illustration of one construction and arrangement adapted for carrying out my improvements.

In the drawings 1 represents the tube mill to which ore is fed by means of a chute or launder 2. Oil and such reagents as may be employed to aid flotation and in particular the oiling of the metalliferous particles, for example an acid solution containing such a quantity of sulphuric acid and aluminum or titanium pyrophosphate that the pulp containing the slimes after separation from the sands will contain in the case of copper sulphide ores about 4 lbs. of acid per ton of dry slime ore (for an ore which normally requires 8 lbs. of acid when used without added salt) and about 0.25 lbs. of aluminum pyrophosphate or 0.10 lbs. of titanium pyrophosphate, are conveniently added to the ore as it enters the tube mill by means of pipes 3 and 4.

The crushed and oiled ore passes from the tube mill through pipe 5 to a Dorr or other classifier 6. As the ore is ordinarily ground with a much smaller amount of water than is used for flotation the additional amount of water may conveniently be added to the pulp in the classifier. This classifier is provided with an inclined bottom 7 up which the sands which settle out are moved by means of rakes (not shown) until they pass over the lip or weir 8 into the pipe 9. At the opposite end of the classifier an overflow lip or weir 43 is provided at a lower level than the lip 8 so that the water in the classifier carrying the slime material in suspension will all flow over the lip 43 while the rakes in moving the sands over the lip will lift them out of the water and deliver them to the pipe 9 very largely dewatered. By this arrangement the electrolytes employed in aiding oiling, which are more especially useful in the flotation of slimes, are removed from the sands and retained in the slimes.

The slimes pass from the lip 43 into a pipe 10 which discharges into the agitation chamber 11 of a machine which may conveniently be of the mechanical agitation type. As the pulp flows into the pipe 10 further additional quantities of reagents, such for example as a solution of aluminum or titanium pyrophosphate, may be added by means of pipe 12. In the agitation chamber 11 a rotatable propeller 13 is provided driven by gearing from a shaft 14. The aerated ore pulp passes through the aperture 15 into the spitzkasten 16 in which the bubbles of air carrying metalliferous particles form a layer of froth 17 while the sands fall to the bottom and can be discharged through the pipe 18 to the tailing pond or another machine for retreatment. The froth flows over a weir into a launder 19 from which the concentrates may be discharged.

Frequently it is desirable to introduce frothing agent with the air or other gas employed for forming the froth either in addition to or in place of liquid oil or a soluble frothing agent. For this purpose the upper part of the agitation chamber 11 and spitzkasten 16 are enclosed by a cover 21 at opposite ends of which pipes 22 and 23 are provided for ingress and egress of air carrying a frothing agent such as oil vapor.

Preferably the machine just described is employed merely as a roughing cell and the concentrates discharged by pipe 20 are retreated in a cleaning cell, as 24.

With most ores this cleaner cell 24 is preferably of the Callow or pneumatic agitation type having a porous bottom 25 through which air may be blown from pipe 26. This air may, if desired, be charged with a frothing agent such as oil vapor. To allow the unutilized portions of the oil vapor to be conserved the upper part of the cell is enclosed at 27 so that the air liberated by the breaking of the bubbles in the froth may be led away by pipe 28 for reintroduction through the pipe 26 with such further additions of air and (or) oil vapor as may be required.

As the concentrates only contain a small percentage of water additional water may be introduced into the cell 24 by means of pipe 36.

The froth flows over weirs into launders along each side of the cell in the usual way and the concentrates, and any froth which does not break down in the launders, passes out through the pipe 29.

The flow of the tails into the pipe 30 is controlled by a valve 31 operated in well-known way by a float 32. These cleaner tails contain considerable quantities of metalliferous matter and so they are preferably returned to the rougher cell by substantial means such as a centrifugal pump 33 and pipe 34. The cells, particularly the rougher cell, are preferably electrically grounded in any suitable way as illustrated diagrammatically at 35.

The sand may conveniently be treated by a similar arrangement of mechanical agitation rougher and pneumatic agitation cleaner cells to those employed for treating the slimes, and in the drawing the same reference letters are used for corresponding parts in the two sets of cells.

However, the method of handling the circuit water is preferably somewhat different in the case of sands than of slimes for the reason that the sands are substantially dewatered by the classifier and further, the tails are readily dewatered as the sands settle quickly. These facts greatly facilitate the operation of the rougher and cleaner cells on a closed cycle so far as the circuit water is concerned. This is particularly advantageous with sand since for particles of large size relatively large quantities of a salt of the type of sodium pyrophosphate is employed for aiding in the production of a collective float of the values in the ores. In many cases it is desirable that oiling take place in acidified water and flotation in alkaline water and the dewatering of the sands by the classifier reduces the amount of alkali required to neutralize the acid in the water still adhering to the sands and to give the water the desirable alkalinity.

For copper sulphide ores a convenient concentration of sodium pyrophosphate is 6 lbs. per ton of ore and if desired free alkali may be employed in addition. The amount of alkali, such as sodium hydroxide, may conveniently range from 0.01 to 0.2 lbs. per ton of ore in excess of that required to neutralize any acid adhering to the particles of ore as they leave the classifier.

In the first place, instead of discharging the tails from the pipe 18 to the tailing pond they may to advantage be transferred to a settling cone 37, from which the circuit water may be drawn off and returned to the system by pipe 38, centrifugal pump 39 and pipe 40. A portion of the circuit water passing through the pipe 40 may conveniently be diverted by pipe 41 to the cleaner cell 24. With this arrangement flotation take place in the same solution in both rougher and cleaner cells.

Additional quantities of water, salt and (or) alkali may be supplied as required by pipe 42.

For purpose of illustration I give in detail the results of practice with a process of the mechanical agitation froth type.

The amounts of electrolyte employed are given merely as examples of concentrations found suitable for certain ores, since, as is well known to those skilled in the art, the exact proportions of those substances which may be used in flotation processes vary somewhat according to the nature of the ore treated.

As it is usually more convenient to add the electrolyte used prior to oiling the effect of the electrolytes added prior to oiling will be considered first.

In the following examples of practice carried out by me the ore employed was a cupriferous pyrite ore which contained about 42% of sulphide of iron and copper in a gangue of quartz and slate.

The ore was ground to pass 80 mesh and was therefore relatively coarse as compared with the slimes used in other practice which will be referred to later.

For emulsification or oiling prior to flotation separation the ground ore was mechanically agitated with three times its weight of water, 0.3% to 0.4% of its weight of oil, and the desired quantity of electrolyte. The percentages of electrolytes used are based on the ore and not on the water.

Using salts of a monovalent acid, i. e. hydrochloric acid, I found that the highest recoveries were obtained with the following percentages of sodium chloride, calcium chloride and aluminum chloride (each used alone without acid) respectively:—

| | |
|---|---|
| Sodium chloride, $NaCl$ | 0.40% |
| Calcium chloride, $CaCl_2$ | 0.27% |
| Aluminum chloride, $AlCl_3$ | 0.06% |

This table clearly shows that the higher the valence of the cation the smaller the quantity of salt required to give the best results for that particular salt. It was further found that not only did the amount of salt required decrease as the valence of the cation increased, but also the amount of sulphide floated increased as the valence of the cation increased. The froth obtained with aluminum chloride was not only thicker, but also much firmer, finer and cleaner than the froth obtained with calcium chloride, and still more so than that obtained with sodium chloride, and, further, the difference between the floats obtained with aluminum chloride and calcium chloride, respectively, was much greater than between calcium chloride and sodium chloride, respectively. However, for the particular ore used, the separation of sulphides, even in the case of aluminum chloride, was inferior to that obtained with sulphuric acid both as regards quantity and quality of concentrate.

Using salts of a trivalent metal with acid radicles of different valence, the highest recoveries were obtained with the following concentrations:—

| | |
|---|---|
| Aluminum chloride $AlCl_3$ | 0.60% |
| Aluminum phosphate $AlPO_4$ (small amount acid added to make salts soluble) | 0.010% |
| Aluminum pyrophosphate $Al_4(P_2O_7)_3$ (small amount acid added to make salts soluble) | 0.0064% |

Here again the efficiency of separation improved as the valence increased.

Using salts of a monovalent metal with acid radicles of difference valence, the highest recoveries were obtained with the following concentrations:—

| | |
|---|---|
| Sodium chloride $NaCl$ | 0.40% |
| Sodium phosphate $Na_3PO_4$ (above) | 0.064% |
| Sodium pyrophosphate $Na_4P_2O_7$ | 0.016% |

With both sodium and aluminum salts increasing the valence of the anion not only decreases the amount of salts required to produce the best results, but also increases the efficiency of separation. It will be observed that the smallest concentrations were obtained when the valence of both the cations and anions was the greatest, namely, when aluminum with sodium pyrophosphate was used.

In connection with sodium pyrophosphate I have found that there are two points of maximum extraction, one about 0.016% and the other above 0.3%. The contact potential of oil steadily rises to a maximum obtained with concentration of sodium pyrophosphate above 0.3% so that the existence of the first maximum point is probably due to the fact that the difficulty with which oiling of the sulphide particles can occur increases to a maximum and then decreases as the concentration of sodium pyrophosphate is increased from zero to 0.3%. Of the two points of maximum extraction the higher concentration has been found by practice to be the most efficient, and this is probably due to the fact that not only is the contact potential on the oil much greater, which means that the oiled sulphide particles will have a more powerful attraction for the positively (frictionally) charged air, but also because at the higher concentration the difficulty of oiling appears to be less than at the lower concentration.

Using sulphuric acid alone, the best results were obtained with a concentration of 1.2%. When, however, mixture of salts and acid were used it was found that the amount of acid which would give the best results in conjunction with the salts was approximately one-half that required when acid alone was used in the case of salts adapted to give trivalent ions, either positive or negative, or both positive and negative, as will be seen from the table given below. In the case of salts adapted to give quadrivalent ions, either negative or positive, it was found that the amount of acid could be advantageously increased beyond this amount (i. e. 0.060%). For instance, with titanium sulphate, increasing the concentration of acid up to 0.74%, gave a steadily increasing yield, so that the best results would be obtained with the even higher concentration of acid than that just referred to. Similarly with sodium pyrophosphate, the best results were obtained with a concentration of acid in excess of 1%.

When the valence of both cation and anion are increased above two the amount of acid which can be usefully employed falls off below 0.60%. The figures for the best concentration of the salt and acid, respectively, in each case are given in the following table:—

| | |
|---|---|
| $AlCl_3$ | 0.12% |
| $Al_2(SO_4)_3$ | 0.06% |
| $AlPO_4$ | 0.016% |
| $Al_4(P_2O_7)_3$ | 0.010% |
| $Fe_2(SO_4)_3$ | 0.16% |
| $Ti(SO_4)_2$ | 0.016% |
| $Na_4P_2O_7$ | 0.016% |
| $H_2SO_4$ | 0.60% |
| $H_2SO_4$ | 0.60% |
| $H_2SO_4$ | 0.53% |
| $H_2SO_4$ (below) | 0.33% |
| $H_2SO_4$ | 0.60% |
| $H_2SO_4$ (above) | 0.74% |
| $H_2SO_4$ (above) | 1.00% |

It will be seen that in each of the above acid and salt mixtures there is a relatively much greater number of hydrogen ions than polyvalent ions produced by the dissociation of the salt, whether such ions are positive or negative.

In the above practice, both with and without acid, salts were used in the absence of heat and of material, such as bichromates adapted to inhibit flotation of certain sulphides.

I have further found that an acid solution of sodium pyrophosphate—0.3% $Na_2P_2O_7$ and 1.00% $H_2SO_4$—gives better results than the above acid solution of sodium pyrophosphate, namely:—0.016% $Na_4P_2O_7$ and 1.00% $N_2SO_4$.

It was found that the aluminum pyrophosphate gave higher extractions than either aluminum chloride or titanium sulphate. With most ores neutral sodium pyrophosphate gave higher extractions than aluminum pyrophosphate, and in practically all cases a strongly acid solution of sodium pyrophosphate give much better results than either neutral sodium pyrophosphate or aluminum pyrophosphate.

Consequently it appears that of the foregoing solutions the one generally most efficient for the mechanical agitation process is a strongly acid solution of sodium pyrophosphate. Such a solution not only increases the extraction but also raises the grade of concentrate, shortens the time required for the flotation treatment and, especially where low pulp densities have been used to permit large amounts of oil to be used efficiently, enables higher pulp densities to be employed.

The ore employed in the foregoing practice was ground to pass 80 mesh but if the ore is ground to pass 200 mesh the results are markedly changed.

Ordinarily the finer the ore is ground the more readily it floats but when a salt of the type of sodium pyrophosphate is present during oiling poorer results may be obtained with slimes than with sands.

This difference is much more marked with zinc ores than with copper ores, doubtless due to the smaller affinity of oil for blende than for sulphides of copper.

Preferably, therefore, prior to flotation treatment the ore is classified in order that the sands or larger particles may be oiled and floated in a different electrolyte than the slimes or fine particles. For the sands the electrolyte may be of the type specially adapted to aid the flotation of the particles when oiled, e. g. sodium pyrophosphate. In the case of the slimes the electrolyte may be of the type specially adapted to aid the oiling of the particles, e. g. an acid solution of aluminum pyrophosphate.

This classification treatment has the further advantage that it facilitates the recovery of the sodium pyrophosphate for further use. It is comparatively easy to de-water sands as they settle rapidly and can be readily separated from water by means of drainage belts or the like. Slimes, on the other hand, require much longer time to settle and more careful treatment to separate the water.

The amount of aluminum pyrophosphate required is so much smaller than the quantity of sodium pyrophosphate needed to give best results that the de-watering of the slimes is not nearly as important as the dewatering of the sands.

In addition to classifying the ore according to size of particle I have found it useful with certain ores to employ mechanical agitation rougher cells in combination with pneumatic agitation cleaners.

In practice using a low grade copper ore ground with oil and floated in the presence of 6 lbs. of sodium pyrophosphate by the mechanical agitation process an extraction of 97.5% was obtained with a concentrate weighing 25% of the original feed. On the other hand, using the pneumatic agitation process and the same amount of such salt, the extraction was only 93% instead of 97.5%, but the concentrate only weighed 16% of the original feed instead of 25%. Accordingly, I propose to employ the two processes in conjunction in order to combine the good features of each. I have found that the above concentration of such salt gives very beneficial results in both forms of process so that the same solution may be used in both rougher and cleaner cells.

Further, I may employ sodium pyrophosphate or other salt merely to improve the grade of concentrate. Thus in the case of zinc ores the beneficial effect of sodium or aluminum pyrophosphate on the grade of concentrate may be as important as the effect of these salts in increasing the extraction.

In practice with zinc ores I have found that a salt such as copper sulphate having a beneficial chemical or electrochemical action should be employed in addition to acid and pyrophosphate, whether sodium or aluminum.

The concentrations of sodium pyrophosphate found most beneficial with zinc ores appear to be very considerably lower than in the case of copper and other ores.

With relatively coarse feed a change in the time of addition has only a slight effect on the extraction. This was shown in the flotation of a copper ore assaying 1.00% Cu ground 16% on 80 mesh.

When the ore and oil were both ground and subsequently floated in the presence of 0.10% $Na_4P_2O_7$ solution (on the water) the tails assayed 0.11% instead of 0.88% when ground with plain water and then floated in a solution of sodium pyrophosphate of that strength. The same ore, both ground and floated in plain water, gave a tail containing 0.25% Cu.

With smaller concentrations of salt the effect is more pronounced. For instance, with a 0.003% solution (on the water) of $Na_4P_2O_7$ on a sample of ore assaying 1.92% Cu, the tails assayed 0.55% Cu when the salt was added prior to grinding and 0.42% Cu when the salt was added after grinding as compared with 0.47% Cu for plain water. This is probably due to the maximum negative potential or the sulphides being reached in much lower concentrations than 0.10% sodium pyrophosphate. If this is the case, then in a 0.10% solution, the negative potential of the sulphide will be brought to a value approaching zero.

The effect of changing the time of addition of the sodium pyrophosphate is much more marked in the case of slimes.

In the case of a copper ore slime assaying about 0.92% Cu using acid alone ($H_2SO_4$ 7 lbs. per ton) the tails contained 0.07% Cu. When sodium pyrophosphate (10 lbs. per ton) was added with the acid prior to oiling the copper in the tails increased to 0.13% but when added after oiling (acid added before oiling) it decreased to 0.045%. This change in the time of addition also increased the grade of rougher concentrate from 8% Cu to 17% Cu as well as very materially hastening the rate of separation.

As the addition of alkali to a solution containing a salt of the type of sodium pyrophosphate greatly aids the latter in increasing the negative charge on the oil I may, especially after oiling in acidified solution, make the solution alkaline by the addition of caustic alkali simultaneously with the introduction of sodium pyrophosphate. Caustic alkali in very small concentrations (up to about 0.001 normal) itself increases the negative potential of oil as well as increasing the amount of high valent anions produced by the dissociation of the sodium pyrophosphate.

The use of various salts adapted to give high valent ions has been referred to, and in particular, sodium and aluminum pyrophosphates. Other similar salts might be used although these two appear to be the most readily available.

As in general the anion appears to be more important than the cation the available salts capable of giving anions having a high valence will be considered first.

As examples of hexavalent anions the tetraphosphates such as $Na_6P_4O_{13}$ and hexametaphosphates such as $Na_6P_6O_{18}$ may be referred to. As instances of salts capable of giving quadrivalent anions may be mentioned the pyrophosphates such as $Na_4P_2O_7$, ferrocyanides such as $K_4Fe(CN)_6$, pyroarsenates such as $Na_4As_2O_7$ and pyroantimonates such as $K_4Sb_2O_7$. Similarly for trivalent anions phosphates such as $Na_3PO_4$, ferricyanides such as $K_3Fe(CN)_6$ or arsenates $Na_3Aso_4$ might be used.

If valence were the only factor to be considered the tetraphosphates and hexametaphosphates would be superior to salts which give quadrivalent or trivalent anions. However, another, almost equally important factor is the extent to which the salt and the corresponding acid dissociates, as this determines the number of high valent anions furnished by a given amount of salt. Any polybasic acid or salt of such acid dissociates in stages. In other words, cations are given off progressively with the formation of negative ions of increasing valence. For instance pyrophosphoric acid ($H_4P_2O_7$) dissociates first to form $H_3P_2O_7^-$ ions, a certain number of which then split up to form $H_2P_2O_7^{--}$ ions, a certain number of which split up to form $HP_2O_7^{---}$ ions, a number of which split up to form $P_2O_7^{----}$ ions. The dissociation constants of the first, second, third and fourth hydrogen ions of pyrophosphoric acid are respectively $1.4\times10^{-1}$, $1.1\times10^{-2}$, $2.9\times10^{-7}$ and $3.6\times10^{-9}$. Consequently the amount of quadrivalent $P_2O_7^{----}$ ion formed is much less than the amount of the trivalent ion, which in turn is very much less than the amount of the divalent ion which in turn is less than the amount of the monovalent ion. The first and second dissociation constants are less than those of sulphuric acid so that pyrophosphoric acid is an even stronger acid than sulphuric. Orthophosphoric acid on the other hand is a weak acid, the dissociation constant for the first, second and third hydrogen ions being $1.1\times10^{-2}$, $2\times10^{-7}$ and $3.6\times10^{-13}$.

Comparing these constants with those for pyrophosphoric acid it will be seen that phosphoric acid only gives as many monovalent ions as pyrophosphoric acid gives divalent and as many divalent as the latter gives trivalent ions. Consequently even though pyrophosphoric acid did not give a quadrivalent ion while phosphoric acid can only give a trivalent ion pyrophosphoric acid would be much superior to phosphoric acid on account of the much larger number of di- and trivalent ions it gives on dissociation.

The dissociation of the acid corresponding to the salt added is very important since, particularly when the electrolyte is added prior to oiling, acidified solutions in general give better results than neutral solutions. Especially after oiling, and this, of course, includes the cleaning of rougher concentrates, the solution may to advantage be made slightly alkaline. Not only do hydroxyl ions tend to increase the negative charge on the oil but also the addition of alkali greatly increases the concentration of high valent anions.

This latter effect results from the fact that the product of the concentrations of the hydrogen and hydroxyl ions is always $10^{-14}$.

In a solution containing only 0.05% of sulphuric acid the hydrogen ion concentration (assuming complete dissociation is $1\times10^{-2}$. In a solution containing 0.05% of sodium hydroxide the hydroxyl ion concentration (assuming complete dissociation) is $1.2\times10^{-2}$ so that the hydrogen ion concentration will be less than $10^{-12}$.

The change from acid to alkaline solution involves a change of hydrogen ion concentration from $1\times10^{-2}$ to $1\times10^{-12}$ which will result in greatly increasing the dissociation of the $H_2P_2O_7^{--}$, $HP_2O_7^{---}$ and similar ions.

In view of the importance of the hydrogen ion concentration and the dissociation constants of the first, second, etc., hydrogen ions of the acid corresponding to the salt used it is usually advisable to employ salts of inorganic acids in preference to those of organic acids as the dissociation of the acids formed in the presence of sulphuric acid is much greater in the case of inorganic acids than of organic acids.

Relatively little is known of tetraphosphoric acid, but the fact that it has been found that over ten times the amount of sodium tetraphosphate is needed to produce the same effect on flotation as a given amount of sodium pyrophosphate indicates that the salt and acid dissociate far less completely than do the pyrophosphates.

Ferrocyanic acid is a strong acid and its salts such as potassium ferrocyanide give very good results in flotation where the formation of insoluble ferrocyanides can be avoided. In view, however, of the fact that pyrophosphoric acid does not readily form injurious insoluble compounds its use is ordinarily to be preferred.

So far as trivalent salts are concerned, these would be superior to pyrophosphates only if they dissociated to an unheard of degree. Phosphates have been shown to be far inferior to pyrophosphates and probably the same is true of the arsenates.

The ferricyanides are in general open to the same objection as the ferrocyanides namely the formation of insoluble compounds which poison flotation.

It appears therefore that the pyrophosphates are the most suitable source of high valent anions for flotation. Sodium pyrophosphate, which appears to be the most generally useful pyrophosphate can be very cheaply and easily prepared from the common phosphate of soda of commerce ($Na_2HPO_4$) by simply heating it to drive off water.

Since in connection with some ores and slime material in particular it may be found advisable to use a salt adapted to give cations and anions, both of high valence, the availability of suitable high valent cations will be considered.

While in the case of polyvalent anions the dissociation constants of the corresponding acid appears to be one of the most important factors, in the case of polyvalent cation the mobility of the ions appears to be a very important factor. For instance, the aluminum ion has a greater mobility than the ferric ion, and it is found that aluminum salts are much more effective in flotation than are ferric salts. For instance when ferric sulphate was used in conjunction with acid, the best results were obtained with a concentration of 0.16% of the salt as compared with 0.060% of aluminum sulphate. This difference between the mobility of the aluminum and the ferric ions is in part if not entirely due to the smaller atomic weight of the aluminum ion, since according to the kinetic theory the velocity of movement of the ions in solution is inversely proportional to the square root of their masses, consequently since the atomic weight of aluminum is 27 and that of iron is 56, we should expect a greater mobility of the aluminum as compared with iron which is exactly the case.

However, the atomic weight is not the only, and in some cases not even the principal factor which determines the mobility of the ion. This is due to the fact that practically all ions are hydrated to a greater or less extent. For instance, the hydrogen ion has two waters of hydration, the potassium ion averages 9.6 water of hydration, while the lithium ion has 24 waters of hydration. This attached water has, of course, the effect of slowing up the action of the ions in solution, so that whereas the hydrogen ion with an atomic weight of 1 has a mobility of 318, and the potassium ion with an atomic weight of 39, a mobility of 65.3 the lithium ion with an atomic weight of 7, has a mobility of only 33.4. Other things being equal, therefore, ions having a high mobility should be selected in preference to those having a low mobility.

Aluminum has an atomic weight smaller than any other tri-valent metal, and since with the exception of iron its salts are cheaper than those of other trivalent metals, its salts are particularly suitable for use in flotation.

There are a number of metals which under certain conditions are quadrivalent, the most common being titanium and tin. Some of the rare earth metals also give quadrivalent cations, such as germanium, thorium, vanadium, uranium and zirconium. Of all these metals the cheapest is titanium, since the oxide, rutile or ilmenite is found in considerable quantities. Titanium has also the smallest atomic weight as its atomic weight is only 48 as compared with 118 for tin and 230 for thorium. Titanium sulphate producing only a divalent anion was found to be inferior to aluminum pyrophosphate and when titanium pyrophosphate was prepared it was found to be largely colloidal in character, so that, although theroretically it should be superior to aluminum pyrophosphate, the number of positive and negative quadrivalent ions produced was apparently not sufficient to enable it to give superior result to aluminum pyrophosphate. The pyrophosphate of other quadrivalent metals might possibly be used to advantage if their cost is not prohibitive.

There are also a number of metals which form pentavalent salts, the principal of these being tungsten. This metal is also hexavalent under certain conditions. However, many of these salts do not appear to exist in the presence of water, at least to any appreciable extent. For instance tungsten pentachloride on treatment with large quantities of water is at once decomposed almost entirely into blue oxide $W_2O_5$ and hydrochloric acid with the evolution of heat.

While I have referred to the employment of oil as a frothing agent, I may use a soluble organic frothing agent such as amyl alcohol either alone or in conjunction with oil.

Further, although oleic acid and similar fatty acids and resinous acids might be used, I prefer not to employ such substances as are capable of forming insoluble compounds with the aluminum or other similar salts used for aiding flotation.

With certain ores the use of an organic frothing agent may be wholly dispensed with and a froth formed by the aid of inorganic material, more particularly salts of the type of sodium pyrophosphate.

Although in the foregoing description of actual practice air only was employed in other practice carried out by me other gases have been employed and in particular air with additions of readily condensable gases. As a general rule, the readiness with which a gas will condense upon a surface depends on the ease with which the gas can be liquefied. For instance, carbon dioxide condenses to a greater extent on a sulphide surface than does air for the reason that the critical temperature of carbon dioxide is +31° C. whereas that of oxygen and nitrogen are, respectively, —118° C. and —146° C.

In some cases I may therefore employ air or other gases containing as a frothing agent a readily condensable vapor, such as the vapor of a hydrocarbon oil, gasolene for example, or a more volatile member of the same series. Further, in place of oil vapor, I may use the vapor of a soluble organic compound such as amyl alcohol.

Such oil or vapor may be employed either in substitution for or in addition to the use of oil in the liquid state or the introduction of a soluble organic frothing agent independently of the air or other gas required to operate the process.

Electrolytes are preferably added to the ore pulp to aid the separation of the metalliferous constituents when such frothing vapor is used.

I claim:

1. The process of concentrating ores which includes mixing the comminuted ore with oil in the presence of an acid, then aerating the so-oiled ore pulp to form a collective froth and separating the froth from the remainder by flotation and which further includes the addition subsequent to the oiling treatment of material adapted to change the contact potential of the oil to a potential more negative than before for aiding the formation of a collective froth.

2. The process of concentrating ores which includes mixing the comminuted ore with oil in the presence of material adapted to change the contact potential of the particles of ore to a potential more positive than before, then aerating the so-oiled ore pulp to form a collective froth, and separating the froth from the remainder by flotation and which further includes the addition subsequent to oiling treatment of material adapted to change the contact potential of oil to a potential more negative than before for aiding in the formation of a collective froth.

3. The process of concentrating ores which includes mixing the comminuted ore with water and an oily liquid, aerating the mixture to form a froth, and separating the froth from the remainder by flotation, and which further includes acidifying the ore pulp prior to oiling and the addition subsequent to oiling of material adapted to reduce the hydrogen ion concentration and to give anions having a greater valence than two for aiding the formation of a froth.

4. The process of concentrating ores which includes mixing the comminuted ore with water and an oily liquid in the presence of acid to oil the metalliferous particles, then aerating the mixture to form a froth and separating the froth from the remainder by flotation, and which further includes the addition intermediate the oiling and aeration treatments of sodium pyrophosphate.

5. The process of concentrating ores which includes mixing the comminuted ore with water and an oily liquid, aerating the mixture to form a froth and separating the froth from the remainder by flotation and which further includes acidifying the ore pulp prior to oiling and the addition of alkali intermediate the oiling and aeration treatments for aiding in the formation of a froth.

6. The process of concentrating ores which includes mixing the comminuted ore with water and an oily liquid in the presence of acid to coat the metalliferous particles with oil, then adding an electrolyte adapted to give higher valent anions than cations to aid in the flotation of the particles so oiled, subsequently aerating the mixture to form a froth and separating the froth from the remainder by flotation.

7. The process of concentrating comminuted masses of composite character which includes the treatment of the mass with an ionizing liquid and a gas, said liquid containing in solution substances adapted to change the contact potential of the constituents of the composite mass to be separated from those of different character to a potential more negative than before and adapted simultaneously to produce a positive frictional electrical charge on the gas and which further includes the movement of the gas relatively to the liquid and the substantial elimination of the electric charge produced on the liquid by such movement.

8. The process of separating composite comminuted masses which includes a preliminary flotation treatment by mechanical agitation, separation of the froth produced by such agitation and a secondary recleaning flotation treatment of such froth by fluid pressure agitation, and which further includes the use in each agitation treatment of a solution adapted to change the contact potential of the valuable constituents of the froth to a potential more negative than before.

9. The process of concentrating comminuted masses of composite character which includes the treatment of the mass with an ionizing liquid and a gas, said liquid containing in solution substances adapted to produce an electrical charge on the gas of opposite sign to that on the constituents of the composite mass to be separated from those of different character, and which further includes the movement of the gas relatively to the liquid and the substantial elimination of the electric charge produced on the liquid by such movement.

10. The process of concentrating comminuted masses of composite character which includes the treatment of the mass with an ionizing liquid and a gas, said liquid containing in solution negative ions having a valence greater than two, said gas having an electrical charge of opposite sign to that on the constituents of the composite mass to be separated from those of different character, and which further includes the movement of the gas relatively to the liquid and the substantial elimination of the electric charge produced on the liquid by such movement.

11. The process of concentrating comminuted masses of composite character which includes the treatment of the mass with an ionizing liquid and a gas, said liquid containing in solution negative ions having a valence greater than three, said gas having an electrical charge of opposite sign to that on the constituents of the composite mass to be separated from those of different character, and which further includes the movement of the gas relatively to the liquid and the substantial elimination of the electric charge produced on the liquid by such movement.

12. The process of concentrating composite, comminuted masses of composite character which includes the treatment of the mass with a gaseous fluid adapted to aid in the movement of certain of the comminuted particles relative to others having different qualities, and which further includes the use of a solution containing a salt of pyrophosphoric acid and a monovalent cation for increasing the selective action of the fluid.

13. The process of concentrating comminuted masses of composite character which comprises mixing the mass with an ionizing liquid containing negative ions having a valence greater than three, and passing bubbles of gas upwardly through the mixture in the substantial absence of violent mechanical agitation whereby certain of the comminuted particles are separated from others having different qualities.

14. The process of concentrating sulphide ores which comprises mixing the comminuted ore with oil and a solution containing anions having a valence greater than three and passing bubbles of air upwardly through the mixture in the substantial absence of violent mechanical agitation whereby the sulphide particles are separated from the gangue.

15. The process of concentrating sulphide ores which comprises mixing the comminuted ore with oil and a solution containing anions having a valence greater than three and passing a gaseous fluid through the mixture in the substantial absence of violent mechanical agitation whereby the sulphide particles are separated from the particles of gangue.

16. The process of concentrating comminuted masses of composite character which comprises the formation of a non-permanent froth by mixing the mass with an ionizing liquid, and passing bubbles of gas through the mixture to form a relatively non-permanent froth with certain of the comminuted particles having a preferential affinity for such gas bubbles and separating the froth so formed from the remainder of the ore, and which further includes the use of anions having a valence greater than three for increasing the said preferential affinity.

17. The process of concentrating ores which includes mixing the comminuted ore with oil, then aerating the oiled pulp, forming a collective froth and separating the froth from the remainder by flotation, and which further includes the addition subsequent to the oiling treatment of material adapted to change the contact potential of oil to a potential more negative than before for aiding in the formation of said collective froth.

18. The process of concentrating ores which includes mixing the comminuted ore with oil, then aerating the oiled pulp, forming a collective froth and separating the froth from the remainder by flotation, and which further includes the addition subsequent to the oiling treatment of alkali for aiding in the formation of said collective froth.

19. The process of concentrating ores which includes mixing the comminuted ore with oil, then aerating the oiled pulp, forming a collective froth and separating the froth from the remainder by flotation, and which further includes the addition subsequent to the oiling treatment of alkaline material adapted to give hydroxyl ions and anions having a greater valence than one for aiding in the formation of said collective froth.

20. The process of concentrating ores which includes mixing the comminuted ore with oil, then aerating the oiled pulp, forming a collective froth and separating the froth from the remainder by flotation, and which further includes the addition subsequent to the oiling treatment of alkaline material adapted to give hydroxyl ions and anions having a greater valence than two for aiding in the formation of said collective froth.

21. The process of concentrating ores by flotation which includes mixing the ore with a modifying agent, aerating to form a collective froth and separating the froth from the remainder by flotation, and which further includes the addition of alkali under such conditions as to aid in the formation of said collective froth without inhibiting the coating of the metalliferous particles of said ore by the modifying agent.

22. The process of concentrating ores by flotation which includes mixing the ore with a modifying agent, aerating to form a collective froth and separating the froth from the remainder by flotation, and which further includes the addition of alkaline material adapted to give hydroxyl ions and anions having a greater valence than one, under such conditions as to aid in the formation of said collective froth without inhibiting the coating of the metalliferous particles of said ore by the modifying agent.

23. The process of concentrating comminuted masses of composite character which includes the treatment of the mass with an ionizing liquid and a gas, said liquid containing in solution substances including hydroxyl ions in excess of those produced by hydrolysis and adapted to change the contact potential of the constituents of the composite mass to be separated from those of different character to a potential more negative than before and adapted simultaneously to produce a positive frictional electrical charge on the gas, and which further includes the movement of the gas relatively to the liquid and the substantial elimination of the electric charge produced on the liquid by such movement.

24. The process of concentrating comminuted masses of composite character which includes the treatment of the mass with an ionizing liquid and a gas, said liquid containing in solution added substances including the salt of a weak polybasic acid and hydroxyl ions in excess of those produced by hydrolysis and adapted to change the contact potential of the constituents of the composite mass to be separated from those of different character to a potential more negative than before and adapted simultaneously to produce a positive frictional electrical charge on the gas, and which further includes the movement of the gas relatively to the liquid and the substantial elimination of the electric charge produced on the liquid by such movement.

25. The process of concentrating comminuted masses of composite character which includes the treatment of the mass with an ionizing liquid and a gas, said liquid containing in solution substances including anions having a valence greater than two and hydroxyl ions in excess of those produced by hydrolysis and adapted to change the contact potential of the constituents of the composite mass to be separated from those of different character to a potential more negative than before and adapted simultaneously to produce a positive frictional electrical charge on the gas, and which further includes the movement of the gas relatively to the liquid and the substantial elimination of the electric charge produced on the liquid by such movement.

26. The process of concentrating ores by flotation which includes mixing the ore with a modifying agent, aerating to form a froth and separating the froth from the remainder by flotation, and which further includes the use of an added salt of a weak polybasic acid and hydroxyl ions in excess of those produced by hydrolysis for aiding in the formation of the froth.

27. The process of concentrating ores by flotation which includes mixing the ore with a modifying agent, aerating to form a froth and separating the froth from the remainder by flotation, and which further includes the use of an added salt of a polybasic acid and hydroxyl ions in excess of those produced by hydrolysis for aiding in the formation of the froth.

28. The process of concentrating ores by flotation which includes mixing the ore with a modifying agent, aerating to form a froth and separating the froth from the remainder by flotation, and which further includes the use of anions having a valence greater than two and hydroxyl ions in excess of those produced by hydrolysis for aiding in the formation of the froth.

In testimony whereof I hereunto affix my signature.

RIDSDALE ELLIS.